United States Patent Office 3,480,176
Patented Nov. 25, 1969

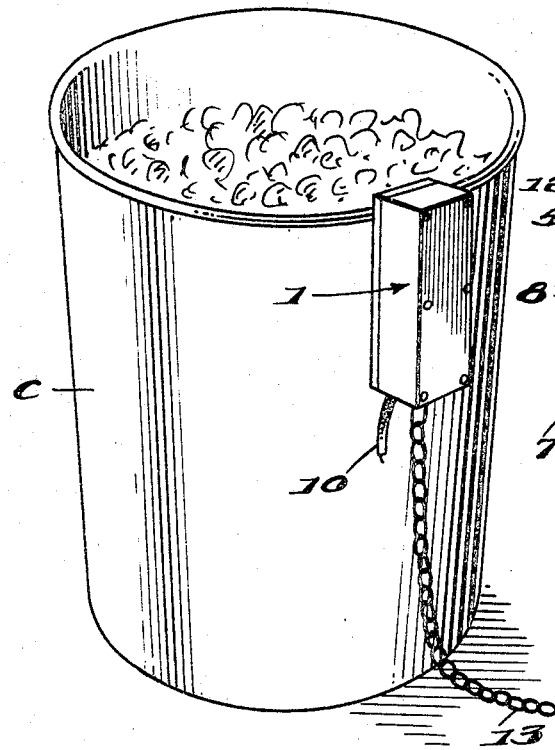
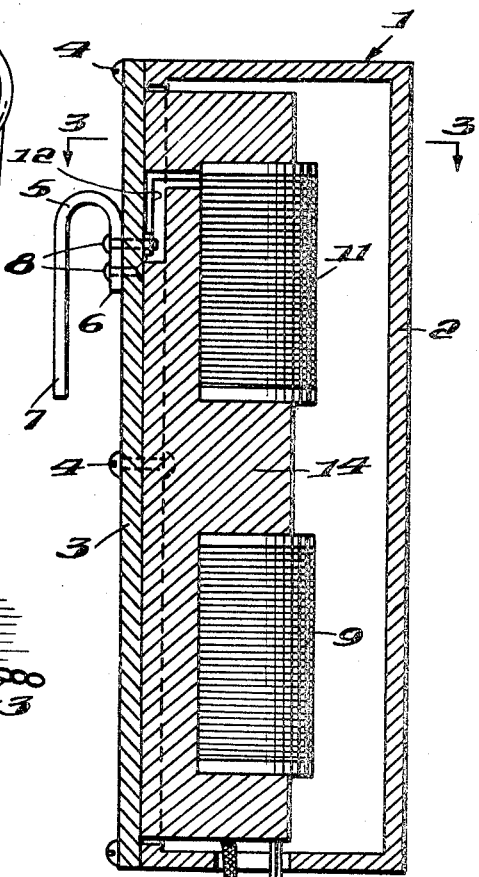
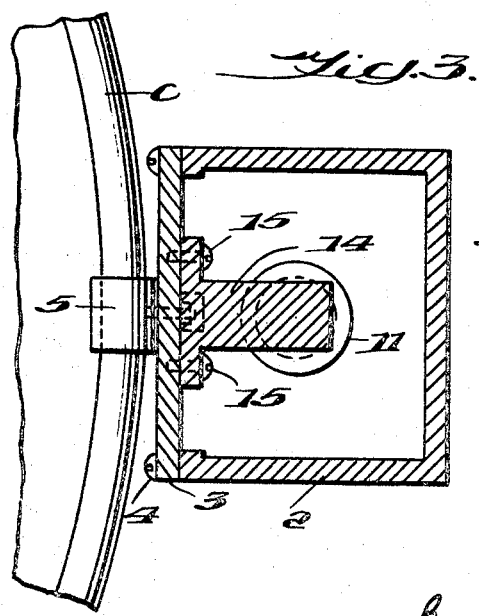
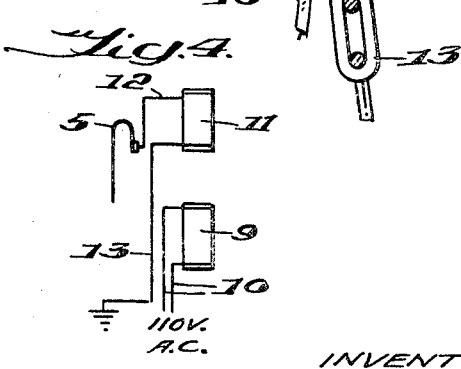

3,480,176
ANIMAL SHOCK DEVICES FOR REFUSE CANS
A C Boyd, 616 Starlite Lane, Knoxville, Tenn. 37920
Filed Jan. 4, 1968, Ser. No. 695,777
Int. Cl. B65d 25/20; A01k 3/00
U.S. Cl. 220—85                                  5 Claims

ABSTRACT OF THE DISCLOSURE

A device for preventing animal interference with refuse cans which is constructed for detachable connection with a can. The can should be of conducting material and insulated from the ground while the device imparts an electric charge thereto which is grounded through the body of the animal in contact with the can. A housing is provided for enclosing the means of imparting a pulsating high voltage current through a hook device that can be connected detachably with the can.

---

This invention relates to improvements in animal shock devices for refuse cans, adapted for preventing animal interference with the cans by imparting shock to animals in contact therewith.

It is well known that predatory animals interfere with refuse cans, such as those containing garbage and trash, causing upset and spillage, and generally great nuisances as a result thereof. No satisfactory way has been found heretofore for preventing interference of animals with refuse cans.

One object of this invention is to provide a device which may be applied simply and readily to a refuse can of electrical conductive material insulated from the ground and which will impart an electrical shock to the animal which comes into contact therewith.

Another object of the invention is to improve the construction of animal shock devices to enable these to be applied to metal cans and the like to impart shock to animals coming into contact therewith.

Still another object of the invention is to simplify and improve the construction of animal shock devices so as to impart an output in a pulsating D.C. high voltage current of from 300 to 600 volts and with a variable ground system which will vary the output voltage.

These objects may be accomplished, according to one embodiment of the invention, by providing a housing with means thereon such as a hook, in position to be engaged in detachable hook engagement with a metal or other suitable can, over an edge thereof, not only to support the device on the can, but also to form an electrical connection therewith for imparting shock through the can to an animal in contact with the can, the current being grounded through the animal's body upon such contact. Suitable means is provided for supplying current of the desired voltage, such as a transformer, the secondary of which is provided with a variable ground, such as a flexible conductor, laid upon the ground. It is preferred to use a chain for this purpose. The input current may be 110 volts A.C.

This embodiment is illustrated in the accompanying drawings, in which:

FIG. 1 is a perspective view of a refuse can, showing the shock device applies thereto, FIG. 2 is a longitudinal sectional view through the housing, illustrating the transformer and connections;

FIG. 3 is a cross section therethrough on the line 3—3 in FIG. 2; and

FIG. 4 is a diagrammatic view of the electrical connections.

The invention is adapted for use with a refuse can, generally illustrated at C, which should be of electrical conducting material, such as a metal can, but should be insulated from the ground as, for example, seated upon a wooden or concrete floor. A rubber mat may be placed under the can if it is seated upon the ground, to act as such insulation.

The shock device includes a housing, generally indicated at 1, comprising an enclosure 2 having a cover plate 3 over the open side thereof and secured together by suitable fastenings, generally indicated at 4.

A device is mounted on the cover plate 3 for connecting the housing with the refuse can C. In this form of the invention this connecting device comprises a hook 5, one end 6 of which abuts against the outer face of the plate 3 while the opposite end of the hook is designated 7 and extends substantially parallel with the end portion 6, but of substantial length so as to project downward into the can to a considerable degree, thereby forming a secure and effective attachment of the device to the can.

The attachment is sufficiently effective so that an animal will not likely knock the device loose from the can, but it will remain in place. The end portion 6 of the hook 5 is connected with the plate 3 through suitable fastenings, such for example as bolts, indicated at 8.

Mounted within the housing 1 is a suitable means for imparting an electrical charge through the metal hook 5 to the can C such, for example, as a transformer. The electrical connection is shown diagrammatically in FIG. 4. This transformer includes a primary coil 9 connected through a line 10 with an electric circuit from a source of 110 volts A.C. current.

A secondary coil 11 has one side thereof connected through a line 12 with one of the fastenings 8 and through the latter to the hook 5. The opposite side of the secondary coil 11 is connected through a ground line 13. It is preferred that a metal chain be used for the ground line because this chain can be laid on the ground and form an effective ground conection when so disposed, and at the same time it provides a variable ground system which will vary the outpot voltage.

In the embodiment illustrated, the primary and secondary coils 9 are mounted in a suitable support 14 carried by the face plate 3 and secured thereto by suitable fastenings 15.

The device, connected with a suitable source of 100 volts A.C. current, may be attached readily to a refuse can merely by hooking the connecting member 5 over the edge of the can. This mounts the device on the can as well as forming an electrical connection therewith. The electric charge thus imparted through the hook 5 to the can will be grounded through the body of the animal which comes into contact with the can.

The device is simple in construction and requires a small, inexpensive transformer and yet will deliver an output from 300 to 600 volts for the purpose described.

I claim:

1. A device for preventing animal interference, in combination with a refuse can of electrical conductive material insulated from the ground, said device comprising a housing, a hook mounted on the housing externally thereof in hook engagement with a portion of the refuse can and supporting the device thereon, means within the housing for providing an electric circuit to the hook and the can, and a flexible ground member connected with the other side of the electric circuit means for closing a circuit therethrough and through a predatory animal in contact with the can.

2. A device according to claim 1, including means for grounding the electrical means including a flexible device extending from the support in position to lie flat upon the ground beside the can.

3. A device according to claim 1, including a flexible chain electrically connected with the electrical means and extending therefrom in position to lie flat upon the ground.

4. A device for preventing animal interference, in combination with a refuse can of electrical conductive material insulated from the ground, said device comprising a housing including a base plate having a cover extending thereover and secured thereto, a transformer mounted on the base plate within the cover and including primary and secondary, the primary being adapted to be connected with a source of electrical supply, a flexible ground member connected with one side of the secondary, a hook mounted on the base plate externally of the housing in hook engagement with an edge of the can and supporting the device thereon and in electrical contact therewith, and means connecting the other side of the secondary with the hook for closing a circuit therethrough and through a predatory animal in contact with the can.

5. A device according to claim 4, wherein the flexible ground member comprises a chain.

References Cited

UNITED STATES PATENTS

| | | | |
|---|---|---|---|
| 2,418,291 | 4/1947 | Dacey | 220—85 |
| 2,647,228 | 7/1953 | Just. | |
| 2,966,621 | 12/1960 | Voll | 317—262 |

RAPHAEL N. SCHWARTZ, Primary Examiner

U.S. Cl. X.R.

317—262